United States Patent [19]

Mathis et al.

[11] Patent Number: 4,535,117

[45] Date of Patent: * Aug. 13, 1985

[54] STABILIZATION OF POLYPHENYLENE SULFIDE

[75] Inventors: Ronald D. Mathis; Jerry O. Reed, both of Bartlesville, Okla.

[73] Assignee: Phillips Petroleum Company, Bartlesville, Okla.

[*] Notice: The portion of the term of this patent subsequent to Nov. 29, 2000 has been disclaimed.

[21] Appl. No.: 548,049

[22] Filed: Nov. 2, 1983

[51] Int. Cl.$^3$ ................................................ C08K 5/09
[52] U.S. Cl. .................................... 524/397; 264/211; 524/429
[58] Field of Search ............... 524/397, 399, 400, 429; 264/211

[56] References Cited

U.S. PATENT DOCUMENTS

| | | | |
|---|---|---|---|
| 2,554,142 | 5/1951 | Grummitt | 524/397 |
| 3,592,794 | 7/1971 | Drake et al. | 260/45.9 |
| 3,717,577 | 2/1973 | Moon | 260/45.7 |
| 4,214,021 | 7/1980 | Blackwell | 427/385 R |
| 4,247,598 | 1/1981 | Blackwell | 524/399 |
| 4,370,437 | 1/1983 | Wilcox et al. | 524/397 |
| 4,405,745 | 9/1983 | Mathis et al. | 524/429 |
| 4,411,853 | 10/1983 | Reed et al. | 524/180 |
| 4,418,029 | 11/1983 | Reed et al. | 524/399 |

OTHER PUBLICATIONS

Hackh's Chemical Dictionary–Fourth Edition, (1972), p. 261.

Primary Examiner—Veronica P. Hoke
Attorney, Agent, or Firm—Howard D. Doescher

[57] ABSTRACT

The heat stability of arylene sulfide polymers, such as poly(p-phenylene sulfide) is improved by the addition of cure retarders comprising metal sorbates and, optionally, an alkaline earth metal nitrite.

20 Claims, No Drawings

STABILIZATION OF POLYPHENYLENE SULFIDE

FIELD OF INVENTION

This invention relates to improving the characteristics of arylene sulfide polymer compositions. In accordance with another aspect, this invention relates to the use of cure retarders in poly(arylene sulfide) compositions. In accordance with another aspect, this invention relates to the use of cure retarders and heat stabilizers comprising metal sorbates in poly(arylene sulfide) compositions to retard cross-linking or substantial alteration of physical properties during heating. In accordance with a further aspect, this invention relates to the use of a nitrite-sorbate stabilizing system to provide the heat stability of arylene sulfide polymer compositions, especially poly(p-phenylene sulfide). In accordance with a further aspect, this invention relates to improving the heat stability of fiber and film grade poly(p-phenylene sulfide) by the addition of at least one metal sorbate and, optionally, a metal nitrite as cure retarders and stabilizers.

BACKGROUND OF THE INVENTION

In applications, such as in the production of fibers and films from arylene sulfide polymers, it is desirable that the melt flow and molecular weight of the polymer remain substantially unchanged during processing of the polymer. Various procedures have been utilized to stabilize arylene sulfide polymers against changes in physical properties during processing. It has now been discovered that arylene sulfide polymers can be treated in a manner such that the polymer properties remain substantially unchanged during heating of the polymer by incorporating into the polymer a cure retarder.

Accordingly, an object of this invention is to provide a process for improving the heat stability of arylene sulfide polymers.

A further object of this invention is to provide an improved process for stabilizing the physical properties, especially melt flow and molecular weight, of arylene sulfide polymers during processing.

A further object of this invention is to provide arylene sulfide polymers having improved physical properties with respect to melt flow and molecular weight, in particular.

A further object of this invention is to provide p-phenylene sulfide polymers exhibiting improved heat stability.

Other objects, aspects, and the several advantages of the invention will be apparent to those skilled in the art upon a study of the specification and the appended claims.

SUMMARY OF THE INVENTION

According to the invention, the heat stability of arylene sulfide polymers is improved by the addition of an effective stabilizing amount of at least one metal sorbate which retards curing and cross-linking of the resin during heating.

In accordance with another embodiment of the invention, the heat stability of arylene sulfide polymers, for example, poly(p-phenylene sulfide), is improved by incorporating therein prior to heating to processing conditions, an effective stabilizing amount of at least one metal sorbate and, optionally, a metal nitrite to retard curing and cross-linking during heating and processing of the polymers.

In accordance with still another embodiment of the invention, the heat stability of film or fiber grade poly(p-phenylene sulfide) is improved by the addition of a metal sorbate and, optionally, an alkaline earth metal nitrite.

In accordance with a specific embodiment of the invention, minor amounts of a metal sorbate, e.g., alkali metal sorbate, and optionally an alkaline earth metal nitrite, e.g., calcium nitrite, at about 1 weight percent, admixed with poly(p-phenylene sulfide) (PPS) provides a cure retarding effect (stabilizing effect) based on the storage modulus results obtained with a Rheometric Dynamic Spectrometer (RDS), as defined hereinafter.

In accordance with another specific embodiment of the invention, the addition of a metal sorbate, e.g., alkali metal sorbate, and, optionally, an alkaline earth metal nitrite, to arylene sulfide polymer compositions reduces the amount of gel formed during melt extrusion of the polymer composition, thereby minimizing plugging of filters and spinnerets which ordinarly causes premature shut-downs and additional clean-up operations.

DESCRIPTION OF THE PREFERRED EMBODIMENTS

The invention is applicable for use with any normally solid, heat curable, high molecular weight arylene sulfide polymer that can be formed into fiber and film. Arylene sulfide polymers which can be employed in the process of this invention include arylene sulfide polymers which have a melt flow of at least about 20 and generally within the range of about 50 to about 400 and higher (determined by the method of ASTM D 1238-70, modified to a temperature of 316° C. using a 5-kg weight, the value being expressed as g/10 min.). Thus, the arylene sulfide polymers can be linear, branched or lightly cross-linked. Although the method by which the polymers of this description are produced is not critical, preferably the polymer employed in the process is prepared by use of polyhaloaromatic compounds, alkali metal sulfides, and organic amides. For example, the arylene sulfide polymers for use in this invention can be produced by the method of U.S. Pat. No. 3,354,129 which is hereby incorporated by reference. The preferred type polymer employed for use in fiber and film applications is prepared by use of a p-dihalobenzene, an alkali metal sulfide, an organic amide, and an alkali metal carboxylate as in U.S. Pat. No. 3,919,177. The disclosure of U.S. Pat. No. 3,919,177 is hereby incorporated by reference.

The cure retarders and cure stabilizers of the invention can be any metal sorbate derived from the metals of Groups IA and IIA of the Periodic Table of Elements. The alkali metal sorbates, especially potassium sorbate, are preferred.

The optional cure retarders and cure stabilizers of the invention that can be used with the metal surbates include any of the alkaline earth metal nitrites, i.e., Group IIA metal nitrites. Representative compounds include magnesium nitrite, calcium nitrite, barium nitrite, and the like, and mixtures thereof. Presently preferred is calcium nitrite.

The amount of cure retarder incorporated into the arylene sulfide polymer of resin will be a finite, effective amount sufficient to improve the heat stability of the polymer. In general, the cure retardant additives of this invention are employed in an amount within the range of about 0.1 to 5, preferably about 0.5 to about 2 and most preferably about one (1) weight percent based on the weight of the arylene sulfide polymer.

Generally, the sorbate-nitrite stabilizing systems will have a nitrite to sorbate mole ratio ranging from about 5:1 to about 1.5. A mole ratio of about 1:1 is presently preferred for the potassium sorbate-calcium nitrite systems. It should be noted that the scope of the invention is not restricted to any of the above ranges but rather requires only that a finite amount of each component sufficient to retard curing and suppress gel formation or to improve thermal stability be used.

In addition to the cure retardant additives of this invention, the compositions can contain other ingredients conventionally employed in arylene sulfide polymer compositions formed into fibers, films, and the like. For instance, fillers such as zinc oxide, pigments, resins, and/or plasticizers, and the like, can be present so long as the particle size is small enough to permit passage of polymer through the processing equipment during formation of fibers and films.

The cure retarder can be incorporated into the arylene sulfide polymer at any stage of processing, preferably prior to being subjected to elevated temperature, or at such times as it is desired to retain melt flow stability. In one practical application of the invention, the cure retarders are incorporated into the arylene sulfide resin, such as a poly(p-phenylene sulfide), prior to melt spinning to form fibers, films, or other formed articles so that gel formation is reduced during melt spinning and problems with filter and spinneret plugging is reduced or obviated.

The processes of this invention of incorporating the cure retarder into the polymer can be conducted batchwise or continuously.

The following example is intended to illustrate the compositions and process of the invention.

EXAMPLE

SAMPLE PREPARATION, TEST METHOD AND RESULTS

A series of samples was prepared by mixing individual portions of linear poly(p-phenylene sulfide), abbreviated PPS, with the specified metal salt, when employed. The PPS was an alkali metal carboxylate modified PPS resin produced in the manner disclosed in U.S. Pat. No. 3,919,177. The recovered polymer was in the form of a powder (fluff) having a melt flow of 250 g/10 minutes as determined in accordance with ASTM D 1238-70, modified to a temperature of 316° C. and using a 5 kg weight.

The procedure consisted of mixing 15 g of the PPS powder with 0.15 g of the metal salt which was dissolved in about 50 cc of methanol. The solvent was removed from each mixture at ambient conditions in a fume hood, e.g. overnight or longer, if necessary. The dried powders were stirred and additionally dried in a vacuum oven at room temperature (about 23° C.) for approximately 2 hours.

Discs measuring 1×0.25 inches (2.54×0.64 cm) were pressed from about 2.5 g of each sample at room temperature by employing a mold and a laboratory press using a platen pressure of about 10,000 psig (69 MPa). Each disc was subsequently melted and converted into a test button by compression molding at 325° C. The molding cycle typically comprised 2½ minutes at a platen pressure of about 4,000–10,000 psig (34–69 MPa) and about 2½ minutes at a platen pressure of about 30,000 psig (207 MPa). While maintaining the latter pressure, heating was discontinued and cooling initiated by circulating tap water through the platens. When the mold temperature reached about 121° C., the pressure was released and the test button removed from the mold. The finished buttons measured about 1×0.1875 inches (2.54×0.48 cm).

Each button was evaluated for changes in degree of crosslinking or melt viscosity in a test employing a Rheometric Dynamic Spectrometer (RDS), available from Rheometrics, Inc. The test, which determines storage modulus as a function of time at a constant shear of 10 radians per second is useful in evaluating the thermal stability of the sample, e.g. crosslinking propensities can be determined.

The apparatus comprises two 1 inch diameter stainless steel plates, the bottom plate connected to a sensing device while the top plate can be horizontally oscillated. The test button is placed between the plates which have been preheated to 300° C. As the sample starts to melt it is squeezed to a thickness of 2 mm. Excess material is removed and the sample is allowed to thermally equilibrate for 3 minutes. The top plate is then oscillated at 10 radians per second with 10 percent strain. Readings are recorded every minute for 20 minutes as dynes per square centimeter. The percent difference between the 6 minute reading and the 20 minute reading is interpreted as indicating the thermal stability of the sample. A positive difference indicates crosslinking may be occurring, the larger the value the greater the degree of crosslinking, since storage modulus is directly proportional to polymer viscosity. By comparing the results obtained with PPS containing no additive with PPS sample containing metal salt(s) it becomes possible to assess the effect of the metal salt on the crosslinking process, e.g. it can function as a cure retarder, cure promotor or have essentially no effect.

The test series consists of 4 samples. Sample 1 is the control containing no metal salt. Sample 2 is the invention containing 1 weight percent potassium sorbate, sample 3 is an invention variation containing 0.5 weight percent each of potassium sorbate and calcium nitrite and sample 4 is a comparison containing 1 weight percent calcium nitrite.

The melt flow and storage modulus results obtained with the samples are set forth in Table I.

TABLE I

| | | | | | | | |
|---|---|---|---|---|---|---|---|
| | | | INFLUENCE OF METAL SALTS ON STORAGE MODULUS | | | | |
| Run No. | Metal Salt | Sample Melt Flow g/10 min | Storage Modulus (SM), Dynes/cm$^2$ | | | $\dfrac{SM_{20}}{SM_2}$ | $\dfrac{SM_{20} - SM_6}{SM_6} \times 100$ |
| | | | 2 min | 6 min | 20 min  $SM_{20} - SM_6$ | | |
| 1 | None | 250 | 1020 | 1140 | 2340  1200 | 2.3 | 105% |
| 2 | K sorbate | 212 | 1530 | 1800 | 2440  640 | 1.6 | 36% |
| 3 | K sorbate plus Ca Nitrite | 197 | 1920 | 2060 | 3740  1680 | 1.9 | 82% |
| 4 | Ca Nitrite | 197 | 3360 | 3630 | 5600  1970 | 1.7 | 54% |

The results in Table I show that all of the metal salts used in runs 2, 3, 4 are about equivalent as cure promoters in PPS based on the lower melt flow values obtained with them relative to the higher melt flow value of control run 1 absent any metal salt. However, significant differences in the behavior of the salts in curing PPS are noted in the storage modulus results. In comparing the percentage differences in the 14 minute interval from 6 minutes to 20 minutes for the 4 runs the results, on a relative basis, indicate that the potassium sorbate of invention run 2 is more effective as a cure retarder, 36 percent increase, then control run 1, 105 percent increase, comparison run 4, 54 percent increase, and invention run 3, 82 percent increase.

Also, differences in the behavior of the salts in curing PPS can be assessed by arranging the storage modulus results of Table I into another form. In doing this the control results from minute 2 to minute 20 are arbitrarily assigned the value of 1 and the results for the other runs are shown relative to them. For example, the value 1530 of run 2 at 2 minutes is divided by the value 1020 of the control at 2 minutes to give 1.5. These results are presented in Table II.

TABLE II

| | RELATIVE EFFECTS OF METAL SALTS ON STORAGE MODULUS | | | |
|---|---|---|---|---|
| Run No. | Metal Salt | Relative Storage Modulus Results | | |
| | | 2 min | 6 min | 20 min |
| 1 | None | 1 | 1 | 1 |
| 2 | K sorbate | 1.5 | 1.6 | 1.04 |
| 3 | K sorbate plus Ca nitrite | 1.9 | 1.8 | 1.6 |
| 4 | Ca nitrite | 3.3 | 3.2 | 2.4 |

The results in Table II show that potassium sorbate, run 2, to be a relatively mild cure retarder compared to calcium nitrite, run 4, across the time interval tested. In addition, its effect substantially diminishes at minute 20 resulting in the storage modulus values of run 2 and control run 1 converging. This levelling effect can be advantageous in processing where a reasonably constant polymer melt viscosity is desirable and is illustrated by the $SM_{20}/SM_2$ values given in Table I.

The addition of calcium nitrite to potassium sorbate, run 3, gives intermediate results suggesting a means to regulate or tailor polymer melt viscosity as needed for the end use desired.

We claim:

1. A polymer composition exhibiting improved heat stability comprising an arylene sulfide polymer containing an effective stabilizing amount sufficient to retard polymer curing and cross-linking of at least one group IA and IIA metal sorbate.

2. An article of manufacture formed from the composition of claim 1.

3. A fiber or film formed from the composition of claim 1.

4. A composition according to claim 1 which additionally contains an alkaline earth metal nitrite.

5. A composition according to claim 1 wherein said arylene sulfide polymer is a poly(p-phenylene sulfide) having a melt flow of about 50 to about 400.

6. A polymer composition exhibiting improved heat stability comprising arylene sulfide polymer having a melt flow ranging from about 50 to about 400 containing an effective stabilizing amount ranging from about 0.5 to about 5 weight percent sufficient to retard curing and cross-linking of at least one metal sorbate derived from the metals of Groups IA and IIA of the Periodic Table of Elements.

7. A composition according to claim 6 wherein said arylene sulfide polymer is poly(p-phenylene sulfide) and said metal sorbate is potassium sorbate.

8. A composition according to claim 6 wherein said composition additionally contains an alkaline earth metal nitrite.

9. A composition according to claim 8 wherein said metal nitrite is calcium nitrite.

10. A composition according to claim 8 wherein said poly(arylene sulfide) is poly(p-phenylene sulfide) which contains potassium sorbate and calcium nitrite as cure retarders.

11. A composition according to claim 10 wherein said poly(p-phenylene sulfide) is an alkali metal carboxylate modified poly(p-phenylene sulfide).

12. A method for improving the heat stability of arylene sulfide polymers which comprises incorporating therein an effective stabilizing amount of at least one Group IA and IIA metal sorbate which amount is sufficient to retard curing and cross-linking of said polymer during heating.

13. A method according to claim 12 wherein the amount of said stabilizer ranges from about 0.1 to about 5 weight percent based on the weight of said polymer.

14. A process according to claim 12 wherein said polymer is poly(p-phenylene sulfide) and said polymer additionally contains an alkaline earth metal nitrite.

15. A method according to claim 13 wherein said arylene sulfide polymer is poly(p-phenylene sulfide), said metal sorbate is potassium sorbate and said polymer additionally contains calcium nitrite.

16. In a process for producing fiber and film by melt extruding an arylene sulfide polymer having a melt flow of about 50 to about 400, the improvement for reducing gel formation during melt extrusion which comprises incorporating into said polymer an effective heat and melt flow stabilizing amount in the range of about 0.1 to about 5 weight percent based on the weight of the arylene sulfide polymer of at least one Group IA and IIA metal sorbate, which amount is sufficient to retard curing and cross-linking or substantial alteration of physical properties of said resin during melt extrusion as determined by Rheometric Dynamic Spectrometer (RDS) storage modulus and thereby minimizing plugging of filters and spinnerets with gel.

17. A process according to claim 16 wherein said polymer is poly(p-phenylene sulfide) and said metal sorbate is potassium sorbate.

18. A process according to claim 16 wherein an alkaline earth metal nitrite is incorporated into the polymer as a retarder.

19. A process according to claim 18 wherein said metal nitrite is calcium nitrite and said metal sorbate is potassium sorbate.

20. A fiber or film formed according to the process of claim 16.

* * * * *